US010983408B2

(12) United States Patent
Wang et al.

(10) Patent No.: US 10,983,408 B2
(45) Date of Patent: Apr. 20, 2021

(54) DISPLAY DEVICE WITH ELECTROCHROMIC MATERIAL

(71) Applicant: Furcifer Inc., Fremont, CA (US)

(72) Inventors: Jian Wang, Fremont, CA (US); Yan Zhou, Fremont, CA (US)

(73) Assignee: Furcifer Inc., Fremont, CA (US)

(*) Notice: Subject to any disclaimer, the term of this patent is extended or adjusted under 35 U.S.C. 154(b) by 108 days.

(21) Appl. No.: 16/222,701

(22) Filed: Dec. 17, 2018

(65) Prior Publication Data
US 2020/0192172 A1    Jun. 18, 2020

(51) Int. Cl.
| | | |
|---|---|---|
| *G02F 1/153* | (2006.01) | |
| *G02F 1/15* | (2019.01) | |
| *G02F 1/1516* | (2019.01) | |
| *G02F 1/163* | (2006.01) | |

(52) U.S. Cl.
CPC ........ *G02F 1/1508* (2013.01); *G02F 1/15165* (2019.01); *G02F 1/163* (2013.01); *G02F 2001/164* (2019.01)

(58) Field of Classification Search
CPC .. G02F 1/15; G02F 1/133305; G02F 1/15165; G02F 1/153; G02F 1/155; G02F 2001/1557
USPC .................. 359/265, 267, 269, 270
See application file for complete search history.

(56) References Cited

U.S. PATENT DOCUMENTS

| | | |
|---|---|---|
| 2002/0141033 A1 | 10/2002 | Ferraris et al. |
| 2007/0153355 A1 | 7/2007 | Huang et al. |
| 2011/0096388 A1* | 4/2011 | Agrawal ................. G02F 1/155 359/268 |
| 2014/0133006 A1 | 5/2014 | Malmstrom |

FOREIGN PATENT DOCUMENTS

EP     3281710 A1    2/2018

OTHER PUBLICATIONS

Search Report for European Application No. 19206359.2, dated Apr. 3, 2020, 8 pages.

* cited by examiner

*Primary Examiner* — Mahidere S Sahle

(57) ABSTRACT

The present disclosure relates generally to multi-layer display devices including electrochromic material and methods of making the same. The display device may include one or more of a first layer comprising a first substrate depicting a display pattern; a second layer comprising an electrochromic polymer; a third layer comprising a solid state electrolyte; a fourth layer comprising a charge storage layer; a fifth layer comprising a second substrate, and/or other components. The one or more of the second layer, the third layer, and/or the fourth layer may be interposed between the first layer and the fifth layer. An application of a voltage between the first substrate and the second substrate may case a change in transmission and/or reflectance of light through the display device such that the display pattern on the first substrate may be displayed.

20 Claims, 3 Drawing Sheets

DISPLAY DEVICE WITH ELECTROCHROMIC MATERIAL

FIELD OF THE INVENTION

The invention generally relates to display devices utilizing electrochromic material.

BACKGROUND

Electrochromism generally refers to a reversible change in optical properties of a material upon application of a potential. In particular, electrochromic materials could change the transmittance, reflectance, absorptance, and/or emittance under the applied voltage.

Electrochromic materials are useful for a variety of applications, including photovoltaic devices, field effect transistors, organic light emitting diodes, general printed electronics, anti-glare window and display systems, etc.

BRIEF SUMMARY

The present disclosure provides unique display devices with electrochromic material and methods of making the same. Since electrochromic materials change the optical properties, a non-self-luminous display device utilizing electrochromic technology may be provided. The display device may be configured to operate in a reflecting and/or a transmitting mode. For example, when the transmission and/or reflectance is modulated, a display device, such as electric paper or e-book, may be realized. One or more advantages of the implementations of the display device presented herein may include one or more of low power consumption, low production cost, and/or other advantage that may become apparent.

An electrolyte is necessary in electrochromic device to provide mobile ions to dope and/or dedope the electrochromic material. Generally, the electrolyte exists in the form of a liquid. Conventionally, the liquid form possesses many disadvantages in actual applications. For example, it's difficult to assemble the device with liquid inside without leaking. Accordingly, it may be advantageous to use a solid polymer electrolyte. The solid polymer electrolyte could be dissolved in certain solvents and solution-deposited onto the substrate at room temperature. After the evaporation of the solvent, the polymer electrolyte becomes solid. The solid polymer electrolyte is distinguishable from aforementioned conventional liquid electrolytes, as well as gel polymer electrolytes including an ionic liquid therein in terms of the following advantages. The solid polymer electrolyte (i) has sufficient mechanical strength yet is versatile in shape so as to allow easy formation into thin films, and thin-film shaped products; (ii) avoids issues related to adhesion and print processing affecting conventional electrolytes; (iii) provides stable contact between the electrolyte/electrode interfaces (those with and without the electrochromic material coating thereon); (iv) avoids the problem of leakage commonly associated with liquid electrolytes; (v) has desirable non-toxic and non-flammable properties; (vi) avoids problems associated with evaporation due to its lack of vapor pressure; (vii) exhibits improved ion conductivities as compared to convention polymer electrolytes, which leads to faster switching time of the electrochromic device. Examples of solid state electrolyte in use with electrochromic devices are shown in U.S. patent application Ser. No. 15/487,325 filed on Apr. 13, 2017 and U.S. patent application Ser. No. 15/729,115 filed Oct. 10, 2017, both of which are incorporated herein in their entirety by reference.

In accordance with one or more implementations, a display device may include multiple layers. The multiple layers may include one or more of a first layer, a second layer, a third layer, a fourth layer, a fifth, layer and/or other layers. The first layer may comprise a first substrate and/or other components. The first substrate may depict a display pattern. By way of non-limiting illustration, the first substrate may include a conductive film coating and the display pattern may be formed on the first substrate via photolithography and/or other patterning techniques. The second layer may comprise an electrochromic polymer and/or other components. The third layer may comprise a solid state electrolyte and/or other components. The fourth layer may comprise a charge storage layer and/or other components. The fifth layer may comprise a second substrate and/or other components. One or more of the second layer, the third layer, the fourth layer and/or other layers may be interposed between the first layer and the fifth layer. The first substrate of the first layer and the second substrate of the fifth layer may then be laminated together to form the multi-layer display device.

A method to form a multi-layer display device including electrochromic materials is described herein. The method may include an operation of providing a first substrate depicting a display pattern. The first substrate may form a layer of the display device. The method may include an operation of depositing an electrochromic polymer on the first substrate. The electrochromic polymer may form a layer. The method may include an operation of providing a second substrate. The second substrate may form a layer. The method may include an operation of depositing a charge storage layer on the second substrate. The charge storage layer may form a layer. The method may comprise an operation of interposing a solid state electrolyte between the first substrate (having the electrochromic polymer deposited thereon) and the second substrate (having the charge storage layer deposited thereon). The solid state electrolyte may form a layer. The method may include an operation of depositing the solid state electrolyte on either the electrochromic polymer or the charge storage layer. The method may include an operation of laminating the first substrate and the second substrate together to form the multi-layer display device.

Other objects, features and advantages of the described implementations will become apparent to those skilled in the art from the following detailed description. It is to be understood, however, that the detailed description and specific examples, while indicating exemplary implementations of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting implementations of the invention may be more readily understood by referring to the accompanying drawings in which.

DETAILED DESCRIPTION OF THE
PREFERRED IMPLEMENTATIONS

In the following description, certain specific details are set forth in order to provide a thorough understanding of various implementations of the invention. However, one skilled in the art will understand that the invention may be practiced without these details. Moreover, while various implementations of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "some implementation" or "an implementation" means that a particular feature, structure, or characteristic described in connection with the implementation is included in at least one implementation of the present invention. Thus, the appearances of the phrases "in an implementation" or "in some implementations" in various places throughout this specification are not necessarily all referring to the same implementation, but may be in some instances. Furthermore, the particular features, structures, or characteristics may be combined in any suitable manner in one or more implementations.

Figure 1:
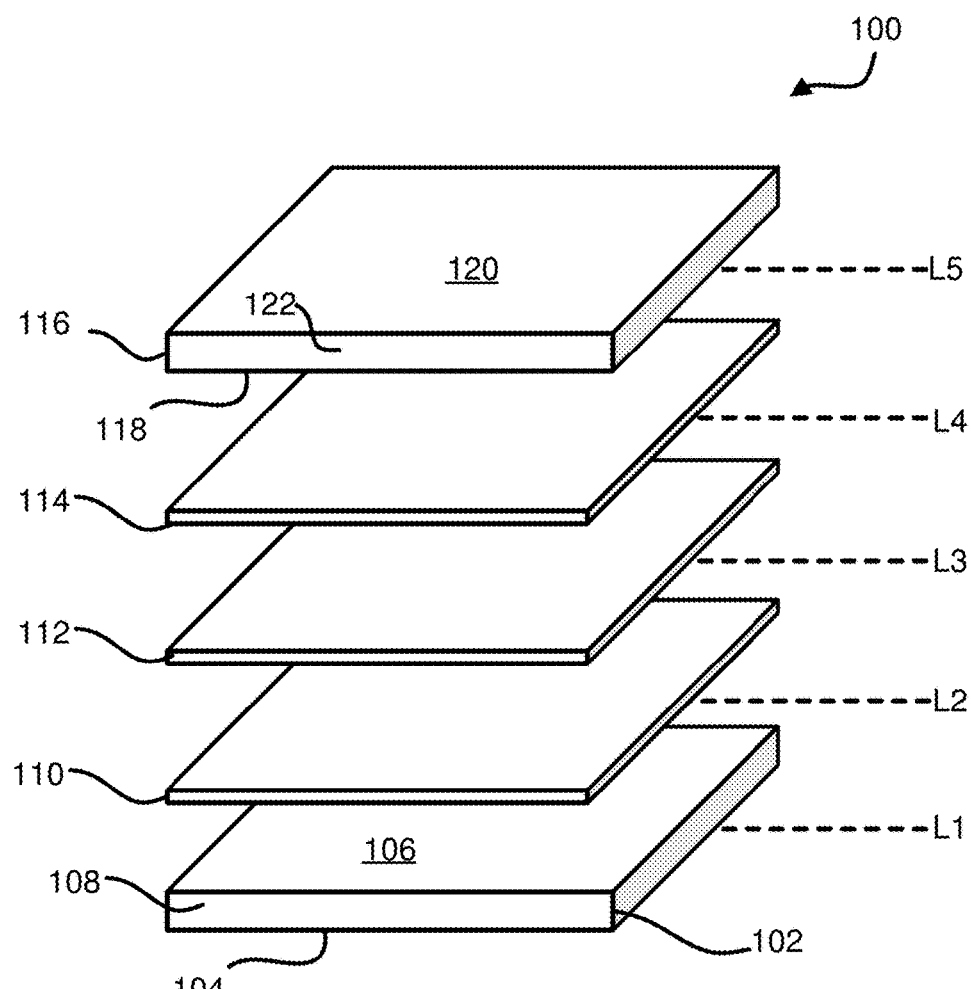
FIG. 1 illustrates a schematic of a multi-layer display device, in accordance with one or more implementations

A simplified schematic of a multi-layer display device 100 with an electrochromic material is shown in FIG. 1, in accordance with one or more implementations. For clarity purposes only, the various layers of the display device 100 in FIG. 1 are shown spaced apart (e.g., prior to lamination).

As shown in FIG. 1, the display device 100 may include one or more of a first layer "L1", a second layer "L2", a third layer "L3", a fourth layer "L4', a fifth layer "L5", and/or other layers. One or more of the second layer L2, the third layer L3, the fourth layer L4, and/or other layers may be interposed (e.g., sandwiched) between the first layer L1 and the fifth layer L5.

The first layer L1 may comprise a first substrate 102 and/or other components. The first substrate 102 may depict a display pattern (not shown in FIG. 1). By way of non-limiting illustration, the first substrate 102 may include a conductive film coating and the display pattern may be formed on the first substrate 102 via photolithography and/or other patterning techniques. The first substrate 102 may include one or more of a first surface 104, a second surface 106 opposite the first surface 104, peripheral side edge 108 communicating between the first surface 104 and the second surface 106, a first conductive film coating (not shown) on the second surface 106 and/or other surfaces, and/or other components. In some implementations, the display pattern may be formed on the second surface 106 of the first substrate 102. The first conductive film coating may include indium tin oxide (ITO) and/or other materials. The thickness of the first substrate 102 may be dictated by the peripheral side edge 108.

The fifth layer L5 may comprise a second substrate 116 and/or other components. The second substrate 116 may be devoid of depictions of patterns (e.g., a "non-patterned" substrate). The second substrate 116 may include one or more of a third surface 118, a fourth surface 120 opposite the third surface 118, peripheral side edge 122 communicating between the third surface 118 and the fourth surface 120, a second conductive film coating (not shown) on one or more surfaces, and/or other components. The second conductive film coating may include indium tin oxide (ITO) and/or other materials.

The second layer L2 may comprise an electrochromic polymer 110 and/or other components. The electrochromic polymer 110 may include a conductive polymer such as one or more of poly-3,4-ethylenedioxy thiophene (PEDOT), poly-2,2'-bithiophene, polypyrrole, polyaniline (PANI), polythiopene, polyisothianaphthene, poly(o-aminophenol), polypyridine, polyindole, polycarbazole, polyquinone, octa-cyanophthalocyanine, combinations thereof, and/or other polymer. In some implementations, the electrochromic polymer 110 may include other material such as one or more of as viologen, anthraquinone, phenocyazine, combinations thereof, and/or other material. In some implementations, electrochromic polymer 110 may instead be a metal oxide such as one or more of $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, and/or other metal. In some implementations, the electrochromic polymer 110 may include a multicolored electrochromic polymer.

The electrochromic polymer 110 may be deposited on the second surface 106 and/or other surfaces of the first substrate 102. The electrochromic polymer 110 may be deposited via a wet coating process and/or other techniques. The wet coating process may include one or more of spin-coating, spray-coating, slot-die coating, dip-coating, blade-coating, meyer bar-coating, gravure-coating, ink-jet printing, screen printing, and/or other technique. The thickness of the electrochromic polymer 110 may depend on an extinction coefficient of the polymer.

The third layer L3 may comprise a solid state electrolyte 112 and/or other components. The solid state electrolyte 112 may include one or more of $Ta_2O_5$, MgF, $Li_3N$, $LiPO_4$, $LiBO_2$—$Li_2SO_4$, and/or other solid state electrolyte. The solid state electrolyte 112 may be deposited on either the electrochromic polymer 110 (prior to or after the electrochromic polymer 110 is deposited on the second surface 106) or the charge storage layer 114 (prior to or after the charge storage layer 114 is deposited on the third surface 118).

In some implementations, a polymer based electrolyte may comprise one or more of an electrolyte salt (e.g., LiTFSI, $LiPF_6$, $LiBF_4$, $LiClO_4$, $LiCF_3SO_3$, $LiN(CF_3SO_2)_2$, $LiSbFg$, $LiAsF_6$, $LiN(CF_3CF_2SO_2)_2$, $(C_2H_5)_4NBF_4$, $(C_2H_5)_3 CH_3NBF_4$, LiI, etc.), a polymer matrix (e.g., polyethylene oxide, poly(vinylidene fluoride) (PVDF), poly(methyl methacrylate) (PMMA), polyethylene oxide (PEO), poly(acrylonitrile) (PAN), polyvinyl nitrile, etc.), one or more optional plasticizers (e.g., glutaronitrile, succinonitrile, adiponitrile, fumaronitrile, etc.), and/or other components.

The fourth layer L4 may comprise a charge storage layer 114 and/or other components. The charge storage layer 114 may be deposited on the third surface 118 of the second substrate 116. The charge storage layer 114 may include one or more of vanadium oxide, binary oxides (e.g., CoO, $IrO_2$, MnO, NiO, and $PrO_x$), ternary oxides (e.g., $Ce_xV_yO_z$), and/or other materials. The charge storage layer 114 may be deposited on the third surface 118 via a wet coating process and/or other techniques.

Figure 2:
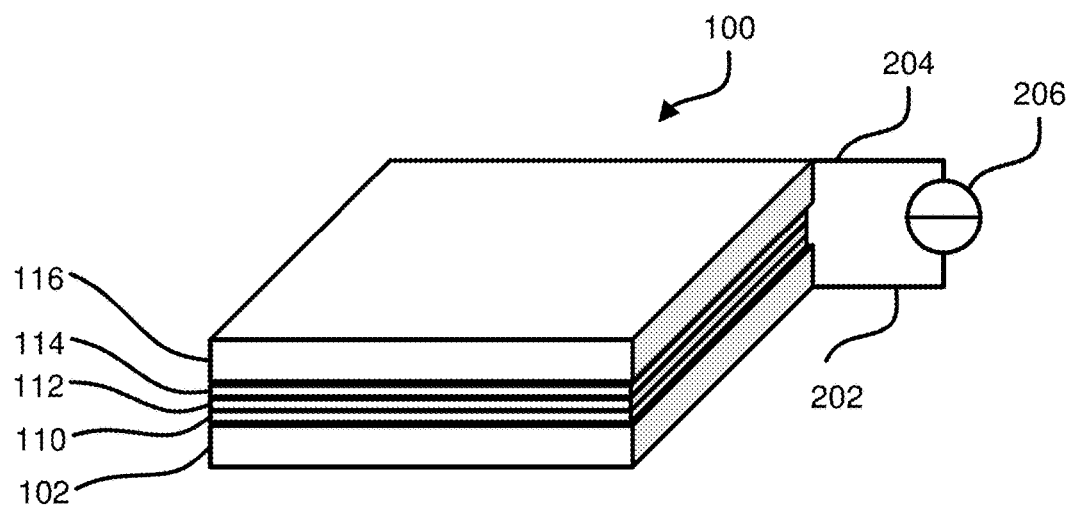
FIG. 2 is a simplified schematic of a multi-layer display device laminated together, in accordance with one or more implementations.

As shown in FIG. 2, the first substrate 102 of the first layer and the second substrate 116 of the fifth layer may be laminated together to form the multi-layer display device 100. The first substrate 102 and the second substrate 116 may be laminated together with the second surface 106 of the first substrate 102 facing toward the third surface 118 of the second substrate 116.

In some implementations, the first substrate 102 and the second substrate 116 may each have about an equal width, length, and/or thickness as one another; however, this need not be the case in other implementations. In some implementations, the first substrate 102, the electrochromic polymer 110, the solid state electrolyte 112, the charge storage layer 114, and/or the second substrate 116 may each have about an equal width, length, and/or thickness as one another; however, this need not be the case in other implementations. By way of non-limiting illustration, in some implementations one or more of the electrochromic polymer 110, the solid state electrolyte 112, and/or the charge storage layer 114 may comprise films with minimal to no appreciably thickness. In some implementations, the thickness may very between 10 μm and 100 μm. In some implementations, the size of the substrates may be larger than, smaller than, or of comparable thickness as other layers.

In some implementations, the display device 100 may include one or more electrical leads coupled to the first conductive film coating of the first substrate 102 and/or the second conductive film coating of the second substrate 116. By way of non-limiting illustration, as shown in FIG. 2, a first electrical lead 202 may be coupled to the first conductive film coating of the first substrate 102 and/or a second electrical lead 204 may be coupled the second conductive film coating of the second substrate 116. An application of a voltage 206 between the first substrate and the second substrate may cause a change in transmission and/or reflectance of light through the display device 100 such that the display pattern on the first substrate 102 may be displayed. An application of a reversed voltage between the first substrate and the second substrate may cause a change in transmission and/or reflectance of light through the display device 100 such that the display pattern on the first substrate 102 may be hidden.

In some implementations, the first substrate 102 and/or second substrate 116 may comprise a rigid (non-pliant) material; a semi-rigid (semi-pliant) material; a pliant/flexible material, and/or combinations thereof. In some implementations, the first substrate 102 and/or second substrate 116 may comprise a transparent material. In some implementations, the first substrate 102 and/or second substrate 116 may be one or more of a transparent glass substrate, plastic substrate (e.g., PVC, EVA, PET, and/or other plastic), and/or other material.

In some implementations, surfaces of the first substrate 102 and/or second substrate 116 to which the material may be deposited may be substantially flat, comprise one or more curved portions, and/or have any desired configuration/shape/dimensions as would be appreciated by skilled artisans upon reading the present disclosure.

In some implementations, the corresponding dimensions (e.g., width, height, etc.) of one or more of: the first substrate 102, the electrochromic polymer 110, the solid state electrolyte 112, the charge storage layer 114, the second substrate 116, may be about equal to one another and/or have other shapes.

Figure 3:
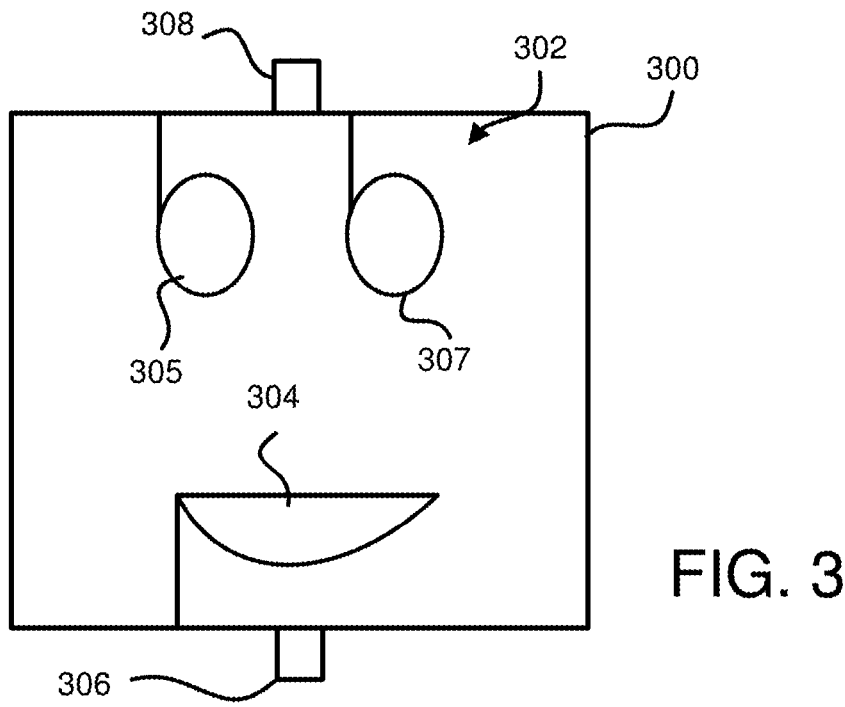
FIG. 3 illustrates a substrate depicting a display pattern, in accordance with one or more implementations.

FIG. 3 illustrates a substrate 300 depicting a display pattern 302, in accordance with one or more implementations. The substrate 300 may include a conductive film coating 304, 305, and/or 307 forming the display pattern 302. The display pattern 302 may be formed on the substrate 300 through photolithography and/or other techniques. The display pattern 302 may form an image. In FIG. 3, for illustrative purposes, the image formed by display pattern 302 may comprise a smiley face. The substrate 300 may further include one or more electrical leads (e.g., first lead 306 and/or second lead 308) coupled to the conductive film coating 304, 305, and/or 307 forming the display pattern 302.

Figure 4:
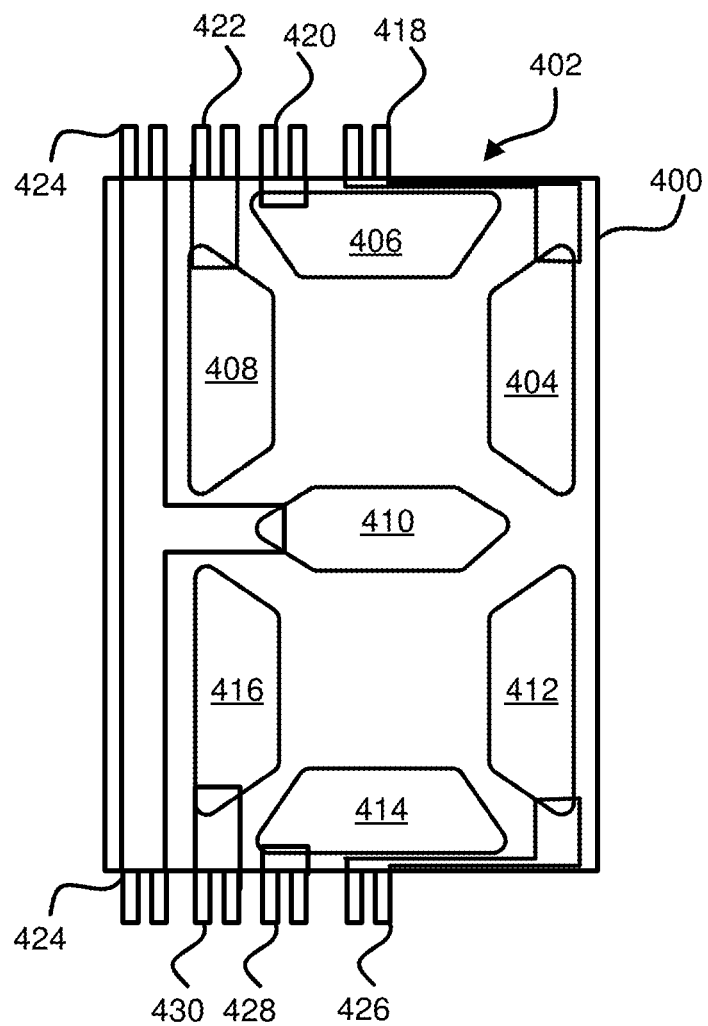
FIG. 4 illustrates a substrate depicting a display pattern, in accordance with one or more implementations.

FIG. 4 illustrates a substrate 400 depicting a display pattern 402, in accordance with one or more implementations. The display pattern 402 may be formed of one or more segments of conductive film coating. The one or more segments may include one or more of a first segment 404, a second segment 406, a third segment 408, a fourth segment 410, a fifth segment 412, a sixth segment 414, a seventh segment 416, and/or other segments. After the segments are patterned, electrochromic polymers may be deposited on top of the segments. Since the polymers may only needed on the conductive film coating segments, selective deposition of the electrochromic polymers may be performed. The selective deposition may include one or more of ink-jet printing, screen printing, and/or other techniques. In some implementations, with the assistance of a mask, blanket printing techniques may be used. The blanket printing techniques may include one or more of spin-coating, spray-coating, slot-die coating, dip-coating, blade-coating, meyer bar-coating, gravure-coating, and/or other techniques.

The display pattern 402 may form an image wherein individual segments may be individually controlled. In FIG. 4, for illustrative purposes, the image formed by display pattern 402 may comprise a pattern where display of individual segments and/or sets of segments may reproduce numbers between "0" and "9." The substrate 400 may further include individual electrical leads coupled to individual ones of the segments to facilitate control of individual segments. By way of non-limiting illustration, a first set of leads 418 may be coupled to the first segment 404, a second set of leads 420 may be coupled to the second segment 406, a third set of leads 422 may be coupled to the third segment 408, a fourth set of leads 424 may be coupled to the fourth segment 410, a fifth set of leads 426 may be coupled to the fifth segment 412, a sixth set of leads 428 may be coupled to the sixth segment 414, a seventh set of leads 430 may be coupled to the seventh segment 416, and/or leads may be coupled to the segments and/or other segments.

After the display device is completed utilizing the substrate of FIG. 4, the display device may be connected to a display driver/controller by a cable (not shown). The display driver may control each segment individually. Depending on the number to be shown on the display device, the driver may apply a positive and/or a negative (e.g., reversed) voltage to individual segments to alter the optical state of the polymer on the individual segments. By doing that, a number may be shown on the display device.

It is noted that the display pattern described with respect to FIG. 4 may be considered as a "positive" image, like a photo. When no image is shown, the display device may be in a transparent state. When the display pattern is to be shown, the segments of the display pattern may be turned to non-transparent state. Another variation of the display device may be is to make "negative" image, like the developed film. When no image is shown, the display device may be in a non-transparent state. When display pattern is to be shown, the segments may be turned to a transparent state. To make such display device, the electrochromic polymer may be be blanket-deposited on the patterned substrate through wet coating process. There would be no need to selectively deposit the polymer on top of the conducted film coated segment. The rest process may be the same as that in making a positive image display as described herein an further with respect to FIG. 5.

Figure 5:
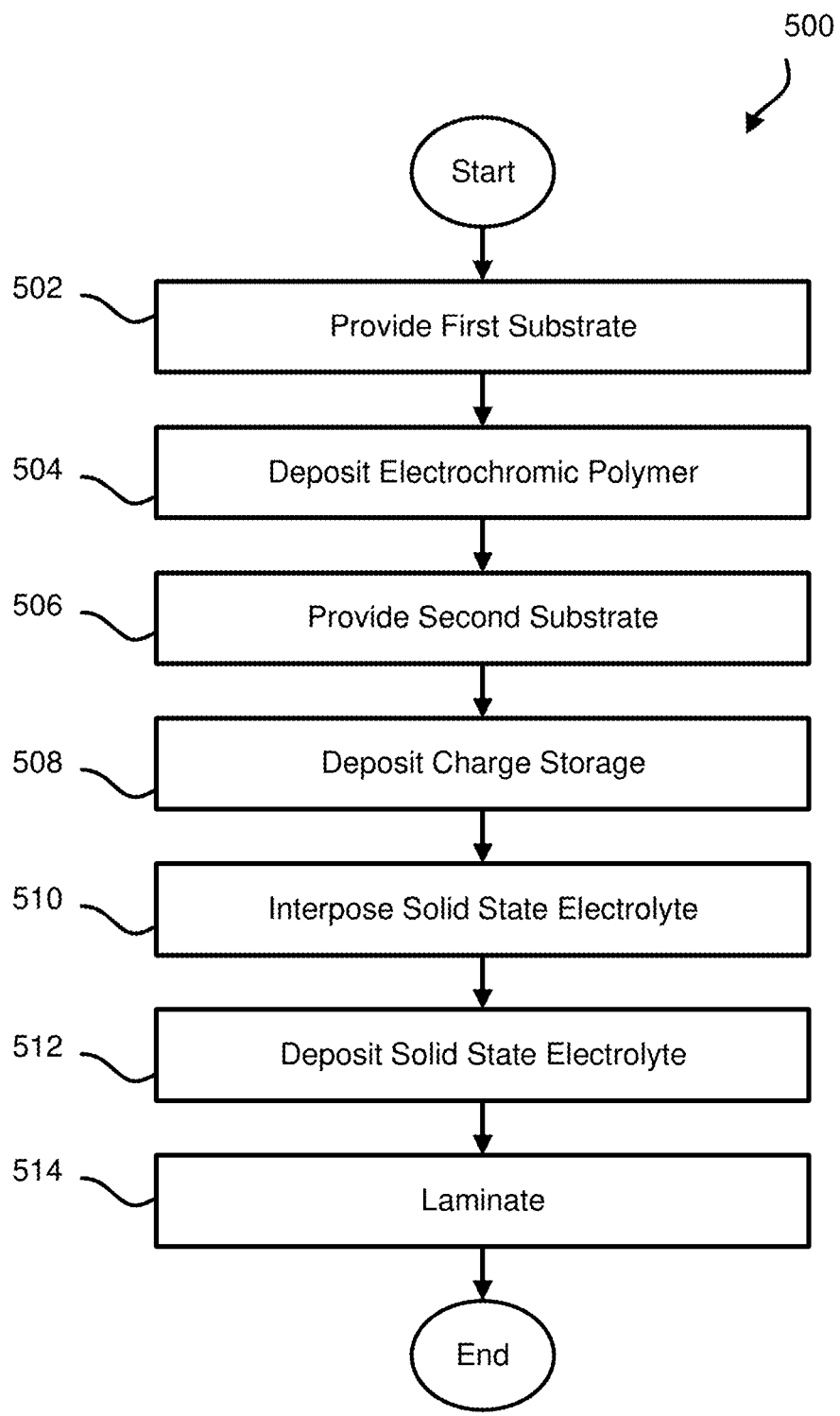
FIG. 5 is a flowchart of a method to form a multi-layer display device including electrochromic materials, in accordance with one or more implementations.

FIG. 5 illustrates a flowchart of a method 500 to form a multi-layer display device including electrochromic materials, in accordance with one or more implementations. The method 500 may be implemented to construct one or more implementations of a display device described herein, such as those described with reference to FIG. 1-4. The method 500 may be carried out in any desired environment, and may include more or less steps than those described and/or illustrated in FIG. 5.

As shown in FIG. 5, the method 500 may include an operation 502 of providing a first substrate depicting a display pattern. The first substrate may form a layer of the display device. The first substrate may include one or more of a first surface, a second surface opposite the first surface, a first conductive film coating on the second surface, and/or other components. The method 500 may include an operation (not shown) of forming the display pattern on the second surface of the first substrate via photolithography and/or other techniques.

At an operation 504, an electrochromic polymer may be deposited on the first substrate. The electrochromic polymer may form a layer of the display device. Depositing the electrochromic polymer on the first substrate may comprise depositing the electrochromic polymer on the second surface of the first substrate. In some implementations, the electrochromic polymer may be deposited on one or more portions of the second surface of the first substrate on which the display pattern is formed.

At an operation 506, a second substrate may be provided. The second substrate may form a layer of the display device. The second substrate may include one or more of a third surface, a fourth surface opposite the third surface, a second conductive film covering on the third surface, and/or other components.

At an operation 508, a charge storage layer may be deposited on the second substrate. The charge storage layer may form a layer of the display device. In some implementations, depositing the charge storage layer on the second substrate may comprise depositing the charge storage layer on the third surface of the second substrate.

At an operation 510, a solid state electrolyte may be interposed (e.g., sandwiched) between the first substrate and the second substrate. The solid state electrolyte may form a layer of the display device.

At an operation 512, the solid state electrolyte may be deposited on either the electrochromic polymer or the charge storage layer.

At an operation 514, the first substrate and the second substrate may be laminated together. In some implementations, laminating the first substrate and the second substrate together may comprise laminating the first substrate to the second substrate with the second surface of the first substrate facing toward the third surface of the second substrate.

Although not specifically show, method 500 may include one or more other operations. The one or more other operations may include one or more of coupling one or more electrical leads to the first conductive film coating and/or the second conductive film coating; applying a voltage between the first substrate and the second substrate to cause a change in transmission and/or reflectance of light through the display device such that the display pattern on the first substrate may be displayed; applying a reversed voltage to cause the display pattern to no longer be displayed; and/or other operations.

In some implementations, the first substrate and/or the second substrate may comprise a transparent material. In an implementation, the first substrate and/or the second substrate may be transparent glass.

In some implementations, the first substrate and/or the second substrate may comprise a rigid (non-pliant) material; a semi-rigid (semi-pliant) material; a pliant/flexible material; and/or combinations thereof.

Implementations of the methods and systems disclosed herein may be used in various applications, devices, industries etc. For instance, several exemplary methods for integrating one or more electrochromic films onto and/or within a substrate structure have been presented herein. Such methods allow for a low cost, reproducible, and convenient process by which an end user may integrate the electrochromic film(s) with a display device.

The invention described and claimed herein is not to be limited in scope by the specific preferred implementations disclosed herein, as these implementations are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A multi-layer display device including electrochromic material, the display device comprising:
   a first layer comprising a first substrate depicting a display pattern, wherein the first substrate includes:
      a first surface;
      a second surface opposite the first surface; and
      a first conductive film coating on the second surface, and wherein the first conductive film coating forms the display pattern;
   a second layer comprising an electrochromic polymer deposited on the second surface of the first substrate, the second surface including a first part coated by the first conductive film coating and a second part that is not coated by the first conductive film coating;
   a third layer comprising a solid state electrolyte;
   a fourth layer comprising a charge storage layer;
   a fifth layer comprising a second substrate;
   wherein the second layer, the third layer, and the fourth layer are interposed between the first layer and the fifth layer; and
   wherein an application of a voltage between the first substrate and the second substrate causes a change in transmission or reflectance of light through the display device such that the display pattern on the first substrate is displayed in a transparent state.

2. The device of claim 1, wherein:
the second substrate includes a third surface, a fourth surface opposite the third surface, and a second conductive film covering on the third surface;
the charge storage layer is deposited on the third surface of the second substrate;
the solid state electrolyte is deposited on either the electrochromic polymer or the charge storage layer; and
the first substrate and the second substrate are laminated together with the second surface of the first substrate facing toward the third surface of the second substrate.

3. The device of claim 2, further including one or more electrical leads coupled to the first conductive film coating and the second conductive film coating.

4. The device of claim 1, wherein the display pattern is formed on the second surface of the first substrate via photolithography.

5. The device of claim 1, wherein the second substrate is devoid of depictions of patterns.

6. The device of claim 1, wherein an application of a reversed voltage causes the display pattern to be hidden.

7. The device of claim 1, wherein the display pattern depicts an image.

8. The device of claim 1, wherein the first substrate and/or the second substrate are rigid.

9. The device of claim 1, wherein the first substrate and/or the second substrate are flexible.

10. A method to form a multi-layer display device including electrochromic materials, the method comprising:
providing a first substrate depicting a display pattern, the first substrate forming a first layer, wherein the first substrate includes:
a first surface;
a second surface opposite the first surface; and
a first conductive film coating on the second surface, and wherein the first conductive film coating forms the display pattern;
depositing an electrochromic polymer on the second surface of the first substrate, the second surface including a first part coated by the first conductive film coating and a second part that is not coated by the first conductive film coating, the electrochromic polymer forming a second layer;
providing a second substrate, the second substrate forming a third layer;
depositing a charge storage layer on the second substrate, the charge storage layer forming a fourth layer;
interposing a solid state electrolyte between the first substrate and the second substrate, the solid state electrolyte forming a fifth layer;
depositing the solid state electrolyte on either the electrochromic polymer or the charge storage layer; and
laminating the first substrate and the second substrate together, wherein an application of a voltage between the first substrate and the second substrate causes the display pattern on the first substrate to be displayed in a transparent state.

11. The method of claim 10, wherein:
the second substrate includes a third surface, a fourth surface opposite the third surface, and a second conductive film covering on the third surface;
depositing the charge storage layer on the second substrate comprises depositing the charge storage layer on the third surface of the second substrate; and
laminating the first substrate and the second substrate together comprises laminating the first substrate to the second substrate with the second surface of the first substrate facing toward the third surface of the second substrate.

12. The method of claim 11, further comprising:
coupling one or more electrical leads to the first conductive film coating and the second conductive film coating.

13. The method of claim 10, further comprising:
forming the display pattern on the second surface of the first substrate via photolithography.

14. The method of claim 10, wherein further comprising:
the applying a voltage between the first substrate and the second substrate causes a change in transmission or reflectance of light through the display device such that the display pattern on the first substrate is displayed in the transparent state.

15. The method of claim 14, further comprising:
reversing the voltage to cause the display pattern to be hidden.

16. The method of claim 10, wherein the display pattern depicts an image.

17. The method of claim 10, wherein the first substrate and/or the second substrate are rigid.

18. The method of claim 10, wherein the first substrate and/or the second substrate are flexible.

19. The device of claim 1, wherein: in response to an application of a reversed voltage, the display pattern is transformed to an opaque state.

20. The method of claim 10, wherein the depositing an electrochromic polymer comprises wet coating the electrochromic polymer on an entirety of the second surface.

* * * * *